US012487067B2

(12) United States Patent
Jang

(10) Patent No.: US 12,487,067 B2
(45) Date of Patent: Dec. 2, 2025

(54) DETONATOR CONNECTOR HAVING WIRE PROTECTION STRUCTURE

(71) Applicant: HANWHA CORPORATION, Seoul (KR)

(72) Inventor: Woo Young Jang, Suwon-si (KR)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 18/279,241

(22) PCT Filed: Jul. 7, 2023

(86) PCT No.: PCT/KR2023/009650
§ 371 (c)(1),
(2) Date: Aug. 29, 2023

(87) PCT Pub. No.: WO2024/219549
PCT Pub. Date: Oct. 24, 2024

(65) Prior Publication Data

US 2025/0076016 A1 Mar. 6, 2025

(30) Foreign Application Priority Data

Apr. 20, 2023 (KR) ........................ 10-2023-0051695

(51) Int. Cl.
*F42D 1/045* (2006.01)
*F42C 19/12* (2006.01)
*H01R 13/639* (2006.01)

(52) U.S. Cl.
CPC .............. *F42D 1/045* (2013.01); *F42C 19/12* (2013.01); *H01R 13/639* (2013.01)

(58) Field of Classification Search
CPC ... F42D 1/045; F42D 3/04; F42D 1/04; F42D 1/043; F42C 19/12; H01R 13/639; H01R 4/2433
(Continued)

(56) References Cited

U.S. PATENT DOCUMENTS 5,064,382 A 11/1991 Minnis
2004/0048520 A1* 3/2004 Kobayashi ............. H01R 9/226 439/709
(Continued)

FOREIGN PATENT DOCUMENTS

AU 2023226667 A1 7/2024
CN 114251985 A 3/2022
(Continued)

OTHER PUBLICATIONS https://www.youtube.com/watch?v=5CnsGszv9CU or https://youtu.be/5CnsGszv9CU?si=uBp19Otu_pLqcjdl Aug. 12, 2020 (Year: 2020).*

*Primary Examiner* — Sreeya Sreevatsa
(74) *Attorney, Agent, or Firm* — WHDA, LLP

(57) ABSTRACT

A detonator connector having a wire protection structure is proposed. The detonator connector includes a wiring bracket member made of a conductive material and provided with a plurality of wire fitting grooves into which a plurality of wires connecting a detonator and a blasting machine to each other is inserted, a lower casing member on which the wiring bracket member is positioned, and an upper casing member configured to cover an upper part of the lower casing member, wherein wire end insertion parts into which end sides of the wires are inserted are provided in an inside of the lower casing member, thereby greatly improving convenience in the work of connecting a blasting machine and a detonator to each other with the wire and reducing working time.

9 Claims, 8 Drawing Sheets

(58) Field of Classification Search
USPC ........................................ 361/248; 102/202.5
See application file for complete search history.

(56) References Cited

U.S. PATENT DOCUMENTS

| | | | | |
|---|---|---|---|---|
| 2018/0258723 | A1 | 9/2018 | Bell et al. | |
| 2021/0356245 | A1* | 11/2021 | Lee | F42D 1/043 |

FOREIGN PATENT DOCUMENTS

| | | | | | |
|---|---|---|---|---|---|
| CN | 216450860 | U | * | 5/2022 | |
| JP | 7-201407 | A | | 8/1995 | |
| KR | 10-2160301 | B1 | | 9/2020 | |
| WO | 2009/059335 | A1 | | 5/2009 | |
| WO | WO-2019189957 | A1 | * | 10/2019 | F42D 1/045 |

* cited by examiner

DETONATOR CONNECTOR HAVING WIRE PROTECTION STRUCTURE

TECHNICAL FIELD

The present disclosure relates to a detonator connector having a wire protection structure and, more particularly, to a detonator connector having a wire protection structure provided with a space into which an end of each wire is inserted.

BACKGROUND ART

In general, explosives are used for construction work such as demolition of bedrock for tunnel construction and demolition of abandoned buildings. That is, by dividing a blasting target by section, a plurality of holes into which the explosives are inserted is drilled. The explosives are inserted into the respective drilled holes and connected to a blasting system. Detonation of the blasting target is conducted by detonating the explosives through the manipulation of the blasting system.

The blasting system is configured to include: a detonator as an initial explosive for detonating an explosive; and a blasting machine for transmitting power and a command, which are required for operation of the detonator, to the detonator. In this case, an electric detonator or an electronic detonator is mainly used as a detonator of the blasting system. The electric detonator or electronic detonator is installed on an explosive side, and a plurality of detonators is connected to one blasting machine.

The electric detonator or electronic detonator includes: a structure that allows a plurality of detonators connected to a corresponding blasting machine to operate simultaneously and detonate explosives at the same time when a command is transmitted from the blasting machine; and a structure that allows a plurality of electronic detonators to be set at different delay times so that the plurality of detonators is sequentially operated, thereby detonating the explosives in sequence.

For a blasting work, a leg wire connected to an electric detonator or electronic detonator, or a bus wire connected to a blasting machine is used by peeling off the coating of an end of the leg or bus wire, and is connected to a bus wire, a leg wire, and an auxiliary bus wire of another electric detonator or another electronic detonator. In this case, there is always a risk of safety accidents due to an explosion caused by a connection part of a leg wire and the like that are likely to be exposed to an earth current or a leakage current in places such as a tunnel where a lot of water or moisture is present.

Such a safety accident becomes a bigger problem, especially when an operator installing an electric detonator or an electronic detonator in an explosive directly contacts a tube of the electric detonator or electronic detonator.

Accordingly, a detonator connector has been proposed to prevent an accident that may occur when a leg wire or a bus wire of electric detonator or electronic detonator are electrically connected to each other.

The detonator connector not only prevents safety accidents due to an earth current, a leakage current, or the like, but also solves the trouble of having to peel off the coatings of the wires and connect the wires to each other directly by an operator.

However, when a detonator and a blasting machine are connected to each other by using the detonator connector in a blasting site, there is a problem that in a case of using a wire by joining an additional wire such as a wiring harness or a leg wire, ends of the wires are exposed, so the exposed wire ends should be protected surrounding by them with an insulation tape or by splitting two strands of each wire to use, thereby creating a difficult working environment.

As a previous patent related to the present disclosure, Korea Utility Model Registration No. 20-0410147, "WIRE CONNECTOR FOR ELECTRIC DETONATOR" (registered on Feb. 24, 2006) has been disclosed.

DISCLOSURE

Technical Problem

An objective of the present disclosure is to provide a detonator connector having a wire protection structure provided with a space into which an end of each wire is inserted, so as to facilitate a process of protecting wire ends.

Technical Solution

In an exemplary embodiment of a detonator connector having a wire protection structure according to the present disclosure, the detonator connector includes: a wiring bracket member made of a conductive material and provided with a plurality of wire fitting grooves into which a plurality of wires connecting a detonator and a blasting machine to each other is inserted; a lower casing member on which the wiring bracket member is positioned; and an upper casing member configured to cover an upper part of the lower casing member, wherein wire end insertion parts into which end sides of the wires are inserted are provided in an inside of the lower casing member.

In the present disclosure, the wire end insertion parts may be positioned to enable folded or bent ends of the wires fitted to the wire fitting grooves of the wiring bracket member to be inserted.

In the present disclosure, each wire end insertion part may include a wire protection partition wall part for surrounding a space in which the ends of the wires are inserted.

In the present disclosure, the wire protection partition wall part may be formed with the insertion space having a size allowing a clearance space to be formed around an outer circumference of the end of each wire.

In the present disclosure, the wire end insertion parts may be positioned between respective side parts of the lower casing member and the wiring bracket member, and the wire protection partition wall part may include: a first wire protection partition wall positioned between a side part of the lower casing member and the wiring bracket member; and a pair of second wire protection partition walls having both ends thereof fixed to the side part and the first wire protection partition wall and spaced apart from each other, so as to form the space enabling the end of each wire to be inserted therein.

In the present disclosure, the first wire protection partition wall may be provided with a wire seating groove part on which each wire is seated.

In the exemplary embodiment of the detonator connector having the wire protection structure according to the present disclosure, the detonator connector may further include a wire protection lubrication member positioned inside the wire end insertion parts to form an oil film by surrounding the end of each wire.

In the exemplary embodiment of the detonator connector having the wire protection structure according to the present disclosure, the detonator connector may further include a terminal protection lubrication member for forming an oil film by surrounding an outer surface of the wiring bracket member.

In the present disclosure, the wire protection lubrication member and the terminal protection lubrication member may be grease.

In the present disclosure, each wire may include a first wire inserted into the inside of the lower casing member through a front wire entrance of the lower casing member; and a second wire inserted into the inside of the lower casing member by passing through a side part of the lower casing member, the wiring bracket member may include: a first wire connection bracket part positioned to be spaced apart from any one side part of the lower casing member and to which any one of a positive pole (+) wire and a negative pole (−) wire of the second wire is fitted and connected; a second wire connection bracket part (120) formed by being folded at a first end side of the first wire connection bracket part (110) and to which any one of a positive pole (+) wire (11) and a negative pole (−) wire of the first wire is fitted and connected; a third wire connection bracket part positioned to be spaced apart from the other side part of the lower casing member and to which the other of the positive pole (+) wire and the negative pole (−) wire of the second wire is fitted and connected; and a fourth wire connection bracket part formed by being bent at a second end side of the third bracket part and to which the other of the positive pole (+) wire and the negative pole (−) wire of the first wire is fitted and connected, and the respective wire end insertion parts may be positioned between any one side part of both side parts of the lower casing member and the first wire connection bracket part, and between the other side part of the lower casing member and the third wire connection bracket part.

Advantageous Effects

The present disclosure is provided with a space into which an end of each wire is inserted, so as to facilitate a process of protecting wire ends, whereby there is an effect of greatly improving convenience in the work of connecting a blasting machine and a detonator to each other with the wires and reducing working time.

Figure 1:
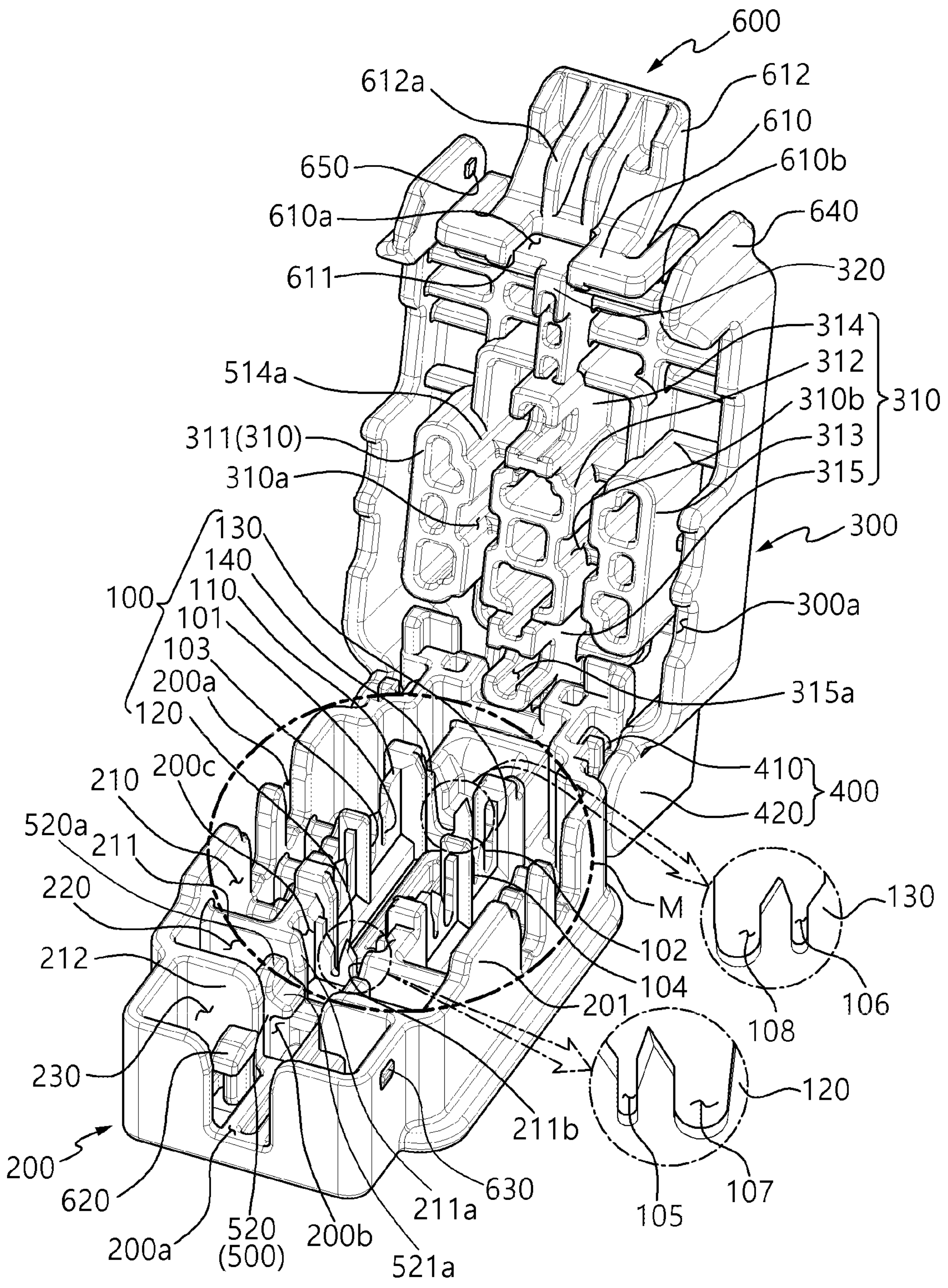
FIGS. 1 and 2 are perspective views illustrating an exemplary embodiment of a detonator connector having a wire protection structure according to the present disclosure.

<Description of the main numerals in the drawings>

| | |
|---|---|
| 10: first wire | 20: second wire |
| 11, 21: (+) wires | 12, 22: (−) wires |
| 100: wiring bracket member | 101: first wire fitting groove |
| 102: second wire fitting groove | 103: first wire through hole |
| 104: second wire through hole | 105: third wire fitting groove |
| 106: fourth wire fitting groove | 107: third wire through hole |
| 108: fourth wire through hole | |
| 110: first wire connection bracket part | |
| 120: second wire connection bracket part | |
| 130: third wire connection bracket part | |
| 140: fourth wire connection bracket part | |
| 200: lower casing member | 200a: side through hole |
| 200b: first wire entrance | 200c: second wire entrance |
| 200d: third wire entrance | 210: wiring space part |
| 211: first partition wall | 220: leg wire locking space part |
| 221: second partition wall | 230: casing locking space part |
| 240: wire end insertion part | 241: first wire protection partition wall |
| 242: second wire protection partition wall | 250: wire protection lubrication member |
| 260: terminal protection lubrication member | |
| 300: upper casing member | 300a: bus wire pressurizing hole |
| 310: wiring pressurizing part | 310a: third bracket insertion part |
| 310b: fourth bracket insertion part | 311: first wiring pressurizing member |
| 312: second wiring pressurizing member | 313: third wiring pressurizing member |
| 314: fourth wiring pressurizing member | 314a: first bracket insertion part |
| 315: fifth wiring pressurizing member | 315a: second bracket insertion part |
| 400: casing connection hinge part | 410: hinge shaft |
| 420: hinge cover part | 500: wire position locking part |
| 510: wire support part | 511: support rod member |
| 520: wire support member | 521: wire catch jaw part |
| 521a: circular arc surface | 600: casing locking part |
| 610: elastic locking panel part | 610a: wire passage part |

-continued

| <Description of the main numerals in the drawings> | |
|---|---|
| 610b: lower side fitting part | 611: first locking catch jaw |
| 612: unlocking handle part | 612a: lock stopper protrusion part |
| 620: first locking catch part | 630: second locking catch jaw part |
| 640: locking side part | 650: second locking catch part |

BEST MODE

Hereinafter, the present disclosure will be described in more detail.

Preferred exemplary embodiments of the present disclosure will be described in detail with reference to the accompanying drawings. Prior to the detailed description of the present disclosure, the terms or words used in the present specification and claims described below should not be construed as being limited to common or dictionary meanings. Accordingly, the exemplary embodiments described in the present specification and the configurations shown in the drawings are only the most preferred exemplary embodiments of the present disclosure, and do not represent all the technical ideas of the present disclosure, and accordingly, it should be appreciated that there may be equivalents and modifications at the time when the present application is filed.

Hereinafter, the present disclosure will be described in more detail.

Preferred exemplary embodiments of the present disclosure will be described in detail with reference to the accompanying drawings. Prior to the detailed description of the present disclosure, the terms or words used in the present specification and claims described below should not be construed as being limited to common or dictionary meanings. Accordingly, the exemplary embodiments described in the present specification and the configurations shown in the drawings are only the most preferred exemplary embodiments of the present disclosure, and do not represent all the technical ideas of the present disclosure, and accordingly, it should be appreciated that there may be equivalents and modifications at the time when the present application is filed.

Figure 2:
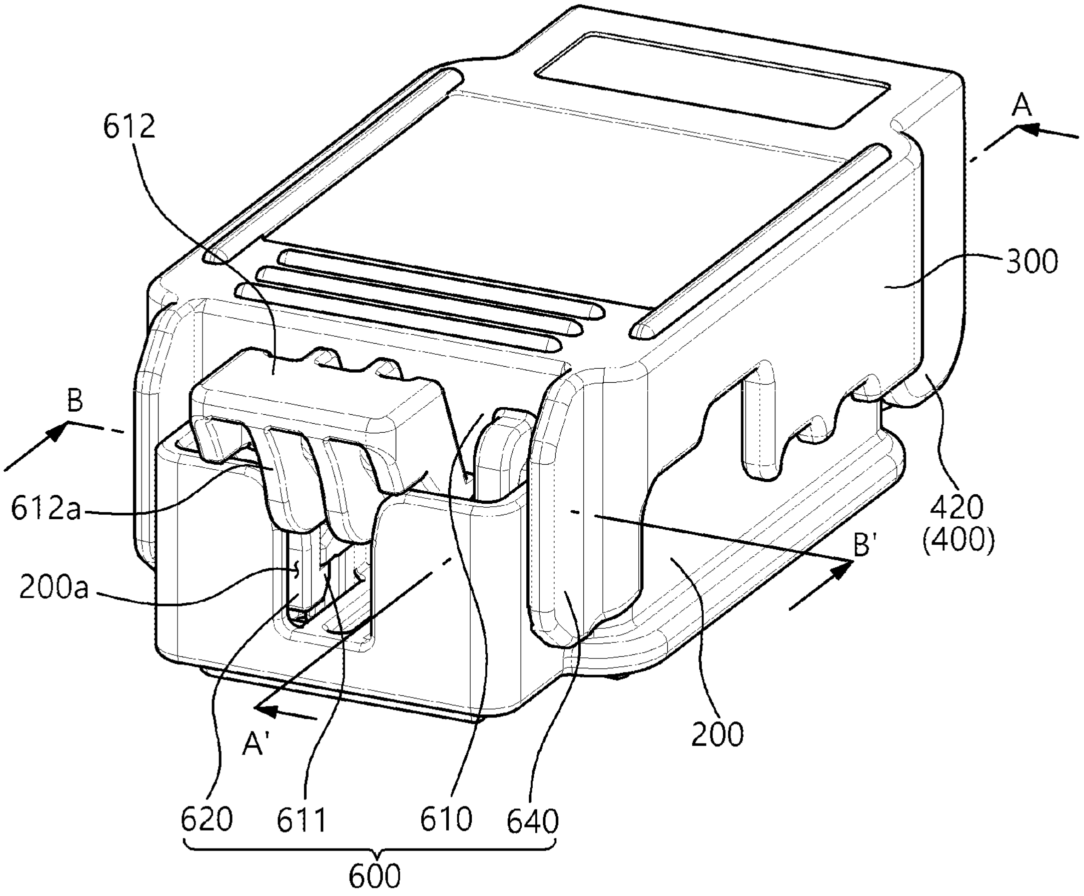
Figure 3:
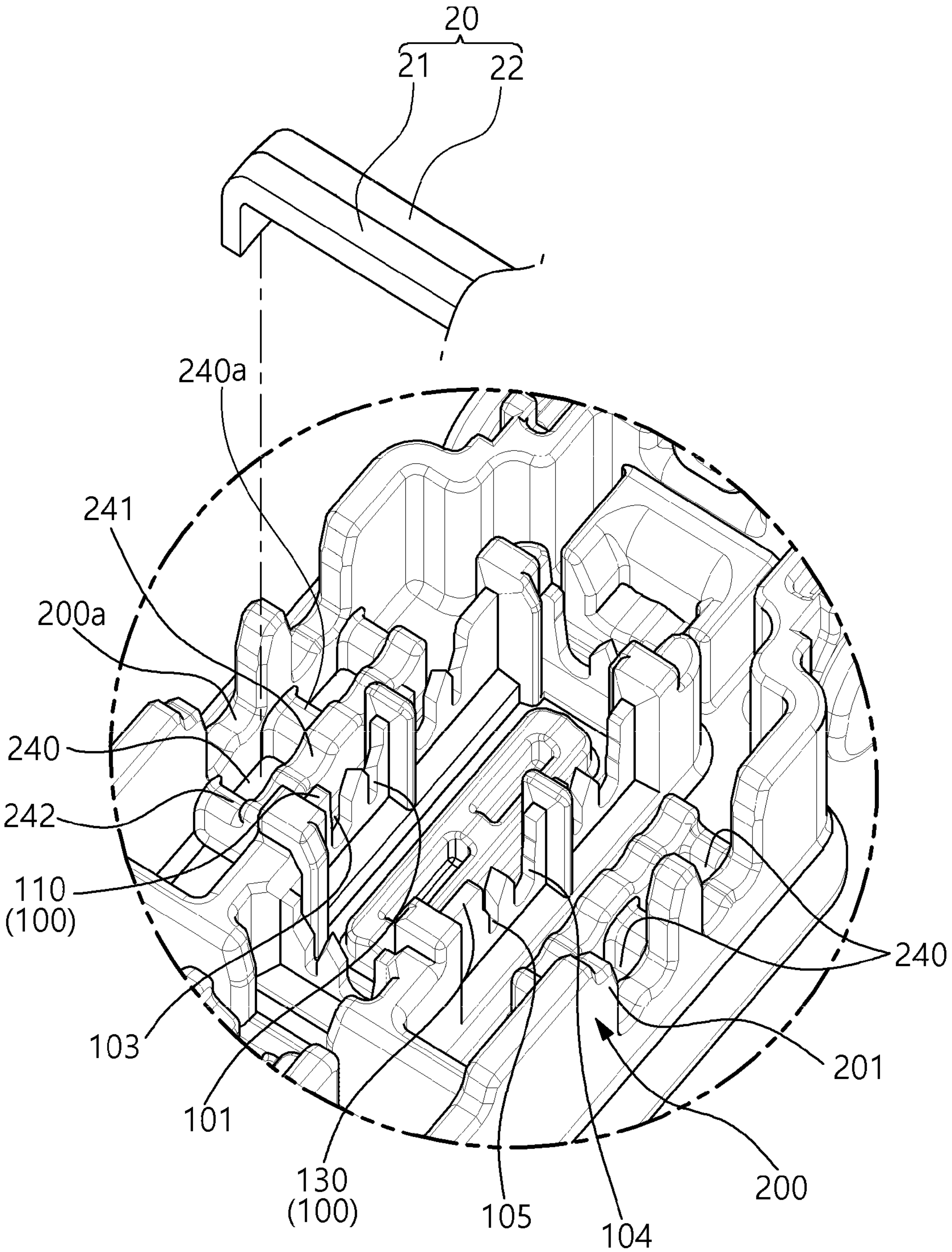
FIG. 3 is an enlarged perspective view of part M of FIG. 1.
Figure 4:
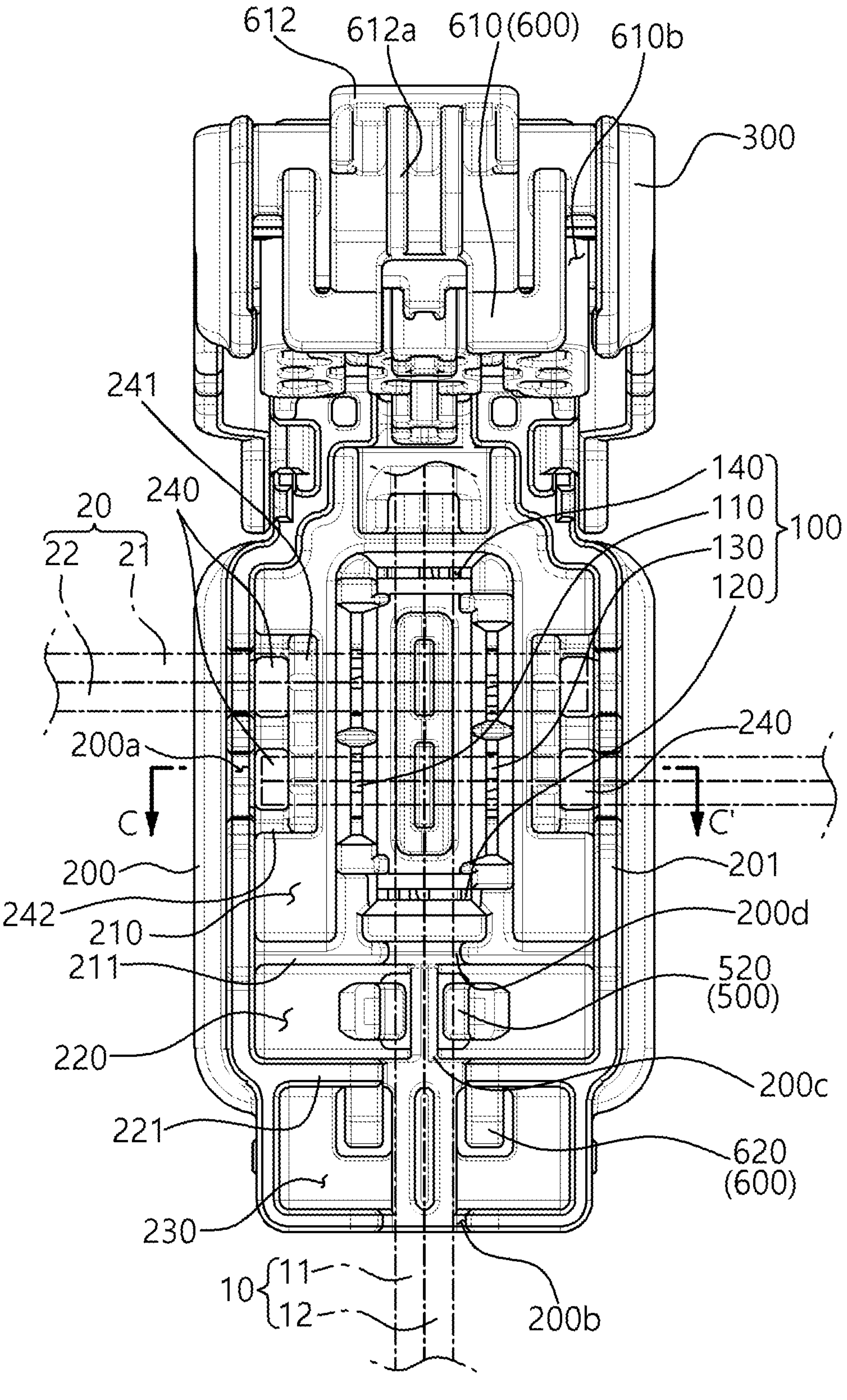
FIG. 4 is a plan view illustrating a lower casing member in the detonator connector having the wire protection structure according to the present disclosure.
Figure 5:
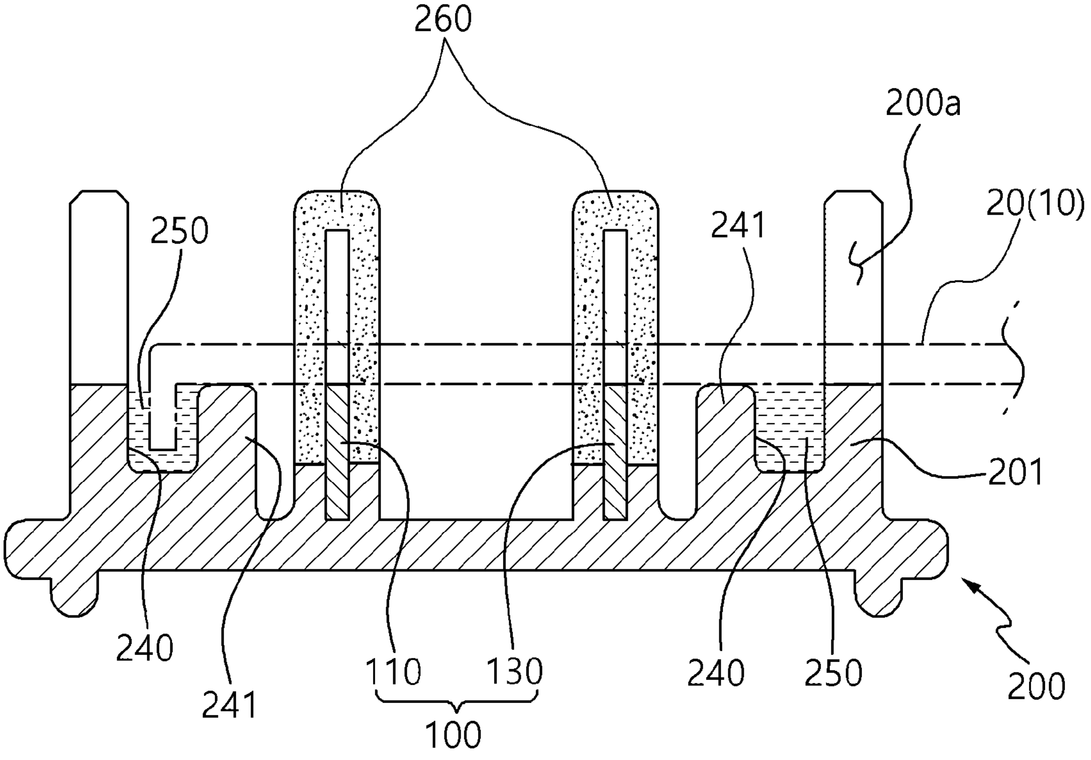
FIG. 5 is a cross-sectional view taken along a line C-C' of FIG. 4.

FIGS. 1 and 2 are perspective views illustrating an exemplary embodiment of a detonator connector having a wire protection structure according to the present disclosure. FIG. 3 is an enlarged perspective view of part M of FIG. 1. FIG. 4 is a plan view illustrating a lower casing member 200 in the detonator connector having the wire protection structure according to the present disclosure. FIG. 5 is a cross-sectional view taken along line C-C' of FIG. 4.

FIG. 1 is a view illustrating a state where an upper side of the lower casing member 200 along with an opened upper casing member 300 is opened in the detonator connector having the wire protection structure according to the present disclosure. FIG. 2 is a view illustrating a state where the upper casing member 300 coupled to the lower casing member 200 is closed in the detonator connector having the wire protection structure according to the present disclosure.

In addition, FIG. 4 is a plan view of the lower casing member 200 in the detonator connector having the wire protection structure according to the present disclosure, and illustrates an example in which a second wire 20 and a first wire 10 are wired to each other in an inside of the lower casing member 200.

Referring to FIGS. 1 to 5, the exemplary embodiment of the detonator connector having the wire protection structure according to the present disclosure will be described in detail below.

In the exemplary embodiment of the detonator connector having the wire protection structure according to the present disclosure, the detonator connector includes a wiring bracket member 100 made of a conductive material and in which a plurality of wire fitting grooves into which a first wire 10 or second wire 20, connecting a detonator and a blasting machine, is inserted is formed.

The first wire 10 and second wire 20 may be a leg wire connected to a detonator or a bus wire connected to a blasting machine.

As an example, in a case where the first wire 10 is the bus wire connected to the blasting machine, the second wire 20 becomes the leg wire connected to the detonator, and in a case where the first wire 10 is the leg wire connected to the detonator, the second wire 20 becomes the bus wire connected to the blasting machine.

In addition, the wiring bracket member 100 is inserted into and positioned in the lower casing member 200, and the upper casing member 300 is rotatably connected to a casing connection hinge part 400 on a rear side of the lower casing member 200.

On the rear side of the lower casing member 200, there is provided a casing connection hinge part 400 for connecting the lower casing member 200 to the upper casing member 300 that rotates to open and close an upper side of the lower casing member 200.

The inside of the lower casing member 200 is opened and closed by the upper casing member 300 rotatably connected to the casing connection hinge part 400. The upper casing member 300 covers an open upper part of the lower casing member 200 and protects the second wire 20 and the first wire 10, which are wired therein, from an external environment.

The casing connection hinge part 400 includes: hinge shafts 410 protruding from both side parts 201 of the lower casing member 200; and hinge cover parts 420 extending downward from both sides of the upper casing member 300 and rotatably hinged to the respective hinge shafts 410.

As an example, the hinge shafts 410 are positioned on both sides of a first casing connection part positioned at a rear end side of the lower casing member 200. As an example, the hinge cover parts 420 are positioned on both sides of a second casing connection part positioned at a rear end side of the upper casing member 300 to cover both sides of the first casing connection part, and on inner surfaces, shaft insertion grooves (not shown) to which the hinge shafts 410 are inserted are positioned.

Although not shown, by including a folding part, the casing connection hinge part 400 may also have a structure that allows both ends thereof to be integrally connected to both of the rear side of the lower casing member 200 and a rear side of the upper casing member 300, respectively, so as to rotate the upper casing member 300 while being folded and unfolded around the folding part as a center.

In addition, a casing locking part 600 for fixing a position of the closed upper casing member 300 is provided in front sides of the lower casing member 200 and the upper casing member 300. The casing locking part 600 locks to allow the upper casing member 300 to be seated on the upper part of the lower casing member 200 so that a position of the upper casing member 300 covering the upper part of the lower casing member 200 may be fixed, and unlocks a locked state so that the lower casing member 200 may be opened.

The wiring bracket member 100 is made of a conductive material so that a first wire 10 of a detonator or a second wire 20 of a blasting machine, which is fitted to the plurality of wire fitting grooves, may be electrically connected to each other.

At an entrance of each wire fitting groove, a V-shaped guide part for guiding a wire to be fitted to a wire fitting groove is positioned, so that a second wire 20 is pressurized when the upper casing member 300 is closed later, thereby allowing the wire to be easily fitted and coupled to the wire fitting groove.

It should be noted that the wiring bracket member 100 is made of a material such as copper or aluminum, which has excellent conductivity, and is manufacturable with any known material capable of electrically connecting a first wire 10 and a second wire 20 to each other.

In the wiring bracket member 100, the first wire 10 is fitted to any one side of the plurality of wire fitting grooves, and the second wire 20 is fitted to another side of the plurality of wire fitting grooves, thereby wiring the first wire 10 and the second wire 20 to each other.

It should be noted that a first wire 10 or a second wire 20 may be variously modified and implemented by using a known electric wire in a form of wire wrapped with a coating, so a detailed description thereof will be omitted.

The first wire 10 is connected to the wiring bracket member 100 by passing through any one side of the plurality of wire fitting grooves, and the second wire 20 is connected to the wiring bracket member 100 by passing through any one side of the plurality of wire fitting grooves.

The first wire 10 and the second wire 20 are fitted to the wire fitting grooves different from each other, so as to be electrically connected to the wiring bracket member, thereby being wired to each other.

The coatings of the first wire 10 and second wire 20 at respective parts fitted to the wire fitting groove are peeled off to expose internal wires thereof, and while being connected to the wiring bracket member 100, the exposed wires are wired to each other through the wiring bracket member 100 made of a conductive material.

The first wire 10 and the second wire 20 may respectively include a (+) wire 11 and (−) wire 12 and a (+) wire 21 and (−) wire 22. The (+) wire 11 of the first wire 10 and the (+) wire 22 of the second wire 20 may be electrically connected to each other through a first wiring bracket part 101. The (−) wire 12 of the first wire 10 and the (−) wire 22 of the second wire 20 may be electrically connected to each other through a second wiring bracket part 102.

As an example, the (+) wire 11 and (−) wire 12 in the first wire 10 and the (+) wire 21 and (−) wire 22 in the second wire 20 have a known electric wire structure where the coatings thereof are positioned side by side adhering each other and boundary parts of the coatings may be split and divided from each other at the boundary of the coatings.

Each wire fitting groove is provided with a sharp coating penetration protrusion for separating a fitting groove into which a wire is fitted from a through hole through which the wire passes, and for penetrating a coating of the wire. When the first wire 10 and the second wire 20 are inserted into respective wire fitting grooves, as any one of the (+) wires 11 and 21 and (−) wires 12 and 22 is fitted to and inserted into a fitting groove, the fitted wire is electrically connected to the wiring bracket member 100, and as the other one of the (+) wires 11 and 21 and the (−) wires 12 and 22 passes through a through hole, the passed wire is not electrically connected to the wiring bracket member 100.

The wiring bracket member 100 includes: a first wire connection bracket part 110 positioned to be spaced apart from any one side part 201 of the lower casing member 200 and to which any one of the (+) wire 21 and the (−) wire 22 of the second wire 20 is fitted and connected; a second wire connection bracket part 120 formed by being folded at a first end side of the first wire connection bracket part 110 and to which any one of the (+) wire 11 and the (−) wire 12 of the first wire 10 is fitted and connected; a third wire connection bracket part 130 positioned to be spaced apart from the other side part 201 of the lower casing member 200 and to which the other of the (+) wire 21 and the (−) wire 22 of the second wire 20 is fitted and connected; and a fourth wire connection bracket part 140 formed by being folded at a second end side of the third wire connection bracket part 130 and to which the other of the (+) wire 11 and the (−) wire 12 of the first wire 10 is fitted and connected.

The first wire connection bracket part 110 and the third wire connection bracket part 130 are positioned side by side and spaced apart from each other between both side parts 201 of the lower casing member 200. The second wire connection bracket part 120 and the fourth wire connection bracket part 140 are positioned side by side and spaced apart from each other between front and rear sides of the lower casing member 200.

A wire entrance through which a first wire 10 may pass is positioned on the front side of the lower casing member 200. The inside of the lower casing member 200 is provided with a wire passage part positioned on a straight line with the wire entrance and configured to allow the first wire 10 to be wired in the straight line.

The first wire 10 wired in the straight line in the wire passage part is fitted and connected to the second wire connection bracket part 120 and the fourth wire connection bracket part 140, which are positioned across the wire passage part.

In the wire fitting groove of the first wire connection bracket part 110, a first wire fitting groove 101 to which any one of the (+) wire 21 and the (−) wire 22 of the second wire 20 is fitted and connected and a second wire through hole 104 through which the other one of the (+) wire 21 and the (−) wire 22 of the second wire 20 passes are separated and positioned with a sharp coating penetration protrusion interposed therebetween. In the wire fitting groove of the third wire connection bracket part 130, a first wire through hole 103 through which any one of the (+) wire 21 and the (−) wire 22 of the second wire 20 passes and a second wire fitting groove 102 to which the other one of the (+) wire 21 and the (−) wire 22 of the second wire 20 is fitted and connected are separated and positioned with a sharp coating penetration protrusion interposed therebetween.

In addition, in the wire fitting groove of the second wire connection bracket part 120, a third wire fitting groove 105 to which any one of the (+) wire 11 and the (−) wire 12 of the first wire 10 is fitted and connected and a third wire through hole 107 through which the other one of the (+) wire 11 and the (−) wire 12 of the first wire 10 passes are separated and positioned with a Sharp coating penetration protrusion interposed therebetween. In the wire fitting groove of the fourth wire connection bracket part 140, a fourth wire through hole 108 through which any one of the (+) wire 11 and the (−) wire 12 of the first wire 10 passes and a fourth wire fitting groove 106 to which the other one of the (+) wire 11 and the (−) wire 12 of the first wire 10 is fitted and connected are separated and positioned with a sharp coating penetration protrusion interposed therebetween.

Side through holes 200*a* through which the second wire 20 passes are positioned on both side parts 201 of the lower casing member 200.

The first wire fitting groove 101 and the first wire through hole 103 are positioned on a straight line, and the second wire through hole 104 and the second wire fitting groove 102 are positioned on a straight line. The first wire fitting groove 101, the first wire through hole 103, the second wire through hole 104, and the second wire fitting groove 102 are disposed on a straight line with the side through holes 200*a*.

The second wire 20 passes through the side through holes 200*a* at one side part 201 of the lower casing member 200, so that any one of the (+) wire 21 and the (−) wire 22 of the second wire 20 is fitted and connected to the first wire fitting groove 101 in the first wire connection bracket part 110 and passes through the second wire through hole 104 in the third wire connection bracket part 130, and the other one of the (+) wire 21 and the (−) wire 22 of the second wire 20 passes through the first wire through hole 103 in the first wire connection bracket part 110 and is fitted and connected to the second wire fitting groove 102 in the third wire connection bracket part 130.

Accordingly, any one of the (+) wire 21 and the (−) wire 22 of the second wire 20 is fitted and connected to the first wire fitting groove 101 in the first wire connection bracket part 110 and the other one of the (+) wire 21 and the (−) wire 22 of the second wire 20 is fitted and connected to the second wire fitting groove 102 in the third wire connection bracket part 130.

The third wire fitting groove 105 and the third wire through hole 107 are positioned on a straight line in a wiring direction of the first wire 10, and the fourth wire through hole 108 and the fourth wire fitting groove 106 are positioned on a straight line in the wiring direction of the first wire 10.

In addition, the first wire 10 is wired in the straight line to the wire passage part in the inside of the lower casing member 200 through the wire entrance. Any one of the (+) wire 11 and the (−) wire 12 of the first wire 10 is fitted and connected to the third wire fitting groove 105 in the second wire connection bracket part 120 and passes through the third wire passage hole 107 in the fourth wire connection bracket part 140. The other one of the (+) wire 11 and the (−) wire 12 of the first wire 10 passes through the fourth wire through hole 108 in the second wire connection bracket part 120 and is fitted and connected to the fourth wire fitting groove 106 in the fourth wire connection bracket part 140.

Accordingly, any one of the (+) wire 11 and the (−) wire 12 of the first wire 10 is fitted and connected to the third wire fitting groove 105 in the second wire connection bracket part 120, and the other one of the (+) wire 11 and the (−) wire 12 of the first wire 10 is fitted and connected to the fourth wire fitting groove 106 in the fourth wire connection bracket part 140.

As an example, the (+) wire 11 of the first wire 10 and the (+) wire 21 of the second wire 20 are respectively connected to the first wire connection bracket part 110 and the second wire connection bracket part 120, and the (−) wire 12 of the first wire 10 and the (−) wire 22 of the second wire 20 are respectively connected to the third wire connection bracket part 130 and the fourth wire connection bracket part 140.

A plurality of side through holes 200*a* through which a second wire 20 may pass or into which the second wire 20 may be inserted is positioned on each of both side parts 201 in the lower casing member 200, and by selecting any one of the plurality of side through holes 200*a*, the second wire 20 may pass or the second wire 20 may be inserted thereinto.

In addition, the plurality of wire fitting grooves and the wire passage holes, which are corresponding to the plurality of side through holes 200*a*, are positioned in the first wire connection bracket part 110 and the third wire connection bracket part 130, so that in the same principle as described above, any one of the (+) wire 21 and the (−) wire 22 of the second wire 20 may be connected to the first wire connection bracket part 110 and any one of the (+) wire 21 and the (−) wire 22 of the second wire 20 may be connected to the third wire connection bracket part 130.

Meanwhile, on a lower surface of the upper casing member 300, there may be positioned a wiring pressurizing part 310 configured to pressurize a first wire 10 or a second wire 20 so as to insert the first wire 10 or the second wire 20 into a wire fitting groove and connect the first wire 10 or the second wire 20 to the wiring bracket member 100.

The wiring pressurizing part 310 pressurizes the first wire 10 or the second wire 20, so that the coating of the first wire 10 or second wire 20 is peeled off in the wire fitting groove while being fitted to an inside of the wire fitting groove, thereby allowing the wire to be electrically connected to, i.e., to access, the wiring bracket member 100.

The wire fitting groove is formed with a width equal to or smaller than a diameter of a wire excluding a coating of a first wire 10 or second wire 20, and thus the first wire 10 or the second wire 20 may be fitted as the coating thereof is peeled off when being fitted thereto.

In a state of being placed on an entrance of the wire fitting groove, i.e., on a V-shaped guide part, the first wire 10 or second wire 20 is electrically connected to, i.e., access, the wiring bracket member 100 as the coating thereof only at a part fitted to the wire fitting groove is peeled off while being pressurized by the wiring pressurizing part 310 and fitted to the wire fitting groove.

A bracket insertion part 311 positioned therein and into which the wiring bracket member 100 protruding from the upper side of the lower casing member 200 may be inserted when the upper casing member 300 is closed is positioned in the wiring pressurizing part 310.

When the upper casing member 300 is closed, as the wiring bracket member 100 is inserted into the bracket insertion part, the wiring pressurizing part 310 pressurizes the first wire 10 or the second wire 20, which is placed on the V-shaped guide part and causes the wire to be fitted to the wire fitting groove.

In addition, in a state where the upper casing member 300 is closed, the wiring pressurizing part 310 pressurizes the first wire 10 or the second wire 20 inside of the lower casing member 200, so as to firmly fix a position of the first wire 10 or second wire 20.

More specifically, the wiring pressurizing part 310 includes: a first wiring pressurizing member 311 inserted between one side surface of the lower casing member 200 and the first wire connection bracket part 110; a second wiring pressurizing member 312 inserted between the first wire connection bracket part 110 and third wire connection bracket part 130; a third wiring pressurizing member 313 inserted between the third wire connection bracket part 130 and the other side surface of the lower casing member 200; a fourth wiring pressurizing member 314 positioned at one end side of the second wiring pressurizing member 312 and provided with a first bracket insertion part 314*a* into which the second wire connection bracket part 120 is inserted; and a fifth wiring pressurizing member 315 positioned at the other end side of the second wiring pressurizing member 312 and provided with a second bracket insertion part 315*a* into which the fourth wire connection bracket part 140 is inserted.

A third bracket insertion part 310*a* into which a first bus wire connection bracket is inserted is positioned between the first wiring pressurizing member 311 and the second wiring pressurizing member 312. A fourth bracket insertion part 310*b* is positioned between the second wiring pressurizing member 312 and the third wiring pressurizing member 313.

In addition, the side through holes 200*a* are formed to open upward. Bus wire pressurizing holes 300*a* formed to open toward lower surfaces and to which a part of the second wire 20 passing through the side through hole 200*a* is inserted to pressurize the second wire 20 are positioned on both sides of the upper casing member 300.

When the upper casing member 300 is closed and a closed state is locked by the casing locking part 600, the second wire connection bracket part 120 is inserted into the first bracket insertion part and the second leg wire connection bracket part is inserted into the second bracket insertion part, so that each of the fourth wiring pressurizing member 314 and the fifth wiring pressurizing member 315 pressurizes the first leg wire 11 and the second leg wire 12 and causes the first leg wire 11 and the second leg wire 12 to be respectively fitted and coupled to the third wire fitting groove 105 and the fourth wire fitting groove 106, thereby electrically connecting the second wire connection bracket part 120 and the fourth wire connection bracket part 140 to each other.

In addition, when the upper casing member 300 is closed and the closed state is locked by the casing locking part 600, the first wire connection bracket part 110 is inserted into a third bracket insertion part and the third wire connection bracket part 130 is inserted into a fourth bracket insertion part, so that each of the first wiring pressurizing member 311, the second wiring pressurizing member 312, and the third wiring pressurizing member 313 pressurizes the first bus wire 21 and the second bus wire 22 and causes the first leg wire 11 and the second leg wire 12 to be respectively fitted and coupled to the third wire fitting groove 105 and the fourth wire fitting groove 106, thereby electrically connecting the second wire connection bracket part 120 and the fourth wire connection bracket part 140 to each other.

In addition, when the upper casing member 300 is closed and the closed state is locked by the casing locking part 600, both side parts of the lower casing member 200 and both side parts of the upper casing member 300 partially overlap, so as to pressurize an upper part of the second wire 20, which is passing through the side through holes 200*a*, through the bus wire pressurizing holes 300*a*, whereby a position of the second wire 20 may be firmly fixed.

Inside the lower casing member 200, there is provided a wire end insertion part 240 into which end sides of the wires 10 and 20 fitted to the wire fitting grooves of the wiring bracket member 100 and electrically connected to the wiring bracket member 100 may be inserted.

That is, into the wire end insertion part 240, a plurality of wires, i.e., an end of at least any one of the first wire 10 and second wire 20, which are fitted to the wire fitting grooves of the wiring bracket member 100 and electrically connected to the wiring bracket member 100, is inserted.

In FIGS. 3 to 5 of the present disclosure, it is shown that the wire end insertion part 240 is positioned so as to allow an end side of the second wire 20 passing through both side parts 201 of the lower casing member 200 to be folded and inserted, whereby it is described below that the end of the second wire 20 is thus inserted. Although not shown, it should be noted that the end of the first wire 10 introduced into the lower casing member 200 through the front entrance side of the lower casing member 200 may be positioned by being folded or inserted.

The wire end insertion part 240 includes a wire protection partition wall part 241 and 242 surrounding a space into which an end of the second wire 20 is inserted, and the end of the second wire 20 may be protected by being inserted into the space surrounded by the wire protection partition wall part 241 and 242.

As an example, the wire protection partition wall part 241 and 242 forms a space into which an end of a wire may be inserted, and forms the insertion space having a size allowing a clearance space to be formed around an outer circumference of the end of the second wire 20.

In addition, the wire end insertion part 240 is positioned to allow the end of the second wire 20, which is folded or bent in the wires 10 and 20 fitted to the wire fitting grooves of the wiring bracket member 100, to be inserted, so that an end side of the second wire 20 electrically connected to the wiring bracket member 100 may be positioned inside the lower casing member 200 without being exposed to the outside of the lower casing member 200.

In a state where the end side thereof is folded or bent, the second wire 20 may be connected to the wiring bracket member 100 by being fitted to the wire fitting groove of the wiring bracket member 100 positioned inside the lower casing member 200. The end side of the second wire 20 is inserted into the wire end insertion part 240 and may be protected by being surrounded by the wire protection partition wall part 241 and 242 inside the lower casing member 200 without being exposed to the outside of the lower casing member 200.

As an example, the wire end insertion part 240 is positioned between the side part 201 of the lower casing member 200 and the wiring bracket member 100, so that the end side of the second wire 20 passing through any one side of both side parts 201 of the lower casing member 200 and connected to the wiring bracket member 100 is inserted by being folded or bent.

More specifically, the respective wire end insertion parts 240 are positioned between any one side part 201 of both side parts 201 of the lower casing member 200 and the first wire connection bracket part 110, and between the other side part 201 of both side parts 201 of the lower casing member 200 and the third wire connection bracket part 130.

As an example, inside the lower casing member 200, as for a wire passing through any one side part of both side parts 201 of the lower casing member 200, any one of the (+) wire 21 and the (−) wire 22 of the second wire 20 is inserted into the first wire fitting groove 101 of the first wire connection bracket part 110 so as to be connected to the first wire connection bracket part 110, and the other one of the (+) wire 21 and the (−) wire 22 of the second wire 20 is fitted and connected to the second wire fitting groove 102 in the third wire connection bracket part 130, and thereafter, folded or bent ends thereof may be inserted into and stored in the wire end insertion parts 240.

The wire end insertion parts 240 are positioned between the respective first wire connection bracket part 110 and third wire connection bracket part 130 and both side parts

201 of the lower casing member 200, and allow the second wire 20 to pass by using both side parts 201 of the lower casing member 200, so that the end of the folded second wire 20 may be protected by being electrically connected to and then inserted into each of the first wire connection bracket part 110 and the third wire connection bracket part 130.

The wire protection partition wall part 241 and 242 is positioned between a side part 201 of the lower casing member 200 and the wiring bracket member 100, and includes: a first wire protection partition wall 241 provided with a wire seating groove part on an upper part of which the second wire 20 is seated; and a pair of second wire protection partition walls 242 each having both ends thereof fixed to the side part 201 and the first wire protection partition wall 241 respectively and positioned to be spaced apart from each other to form a space into which the end of the second wire 20 may be inserted.

The pair of second wire protection partition walls 242 is positioned to be spaced apart from each other in a longitudinal direction of the first wire protection partition wall 241 so that the end of the wire, i.e., the end of the second wire 20 is inserted therebetween, and forms an inner space of the wire end insertion part 240 so that a clearance space in which a wire protection lubrication member 250 to be described later may be filled around the end of the second wire 20 is formed.

Including the side parts 201 of the lower casing member 200, in the wire end insertion part 240, the wire protection partition wall part 241 and 242 forms a space into which the end of the second wire 20 may be inserted, so that a structure may be simplified and a wire whose end side is inserted into the upper part of the first wire protection partition wall 241 may be seated in the wire seating groove part, whereby the positions of the wires 10 and 20 may be stably maintained in a fixed state.

It should be noted that the wire end insertion part 240 may be variously modified and implemented in a position where the ends of wires 10 and 20 may be bent or folded to be inserted, the wires 10 and 20 having passed through the front or both sides of the lower casing member 200 and being inserted into the lower casing member 200 so as to be connected to the wiring bracket member 100.

In addition, an inner space of the wire end insertion part 240 is divided so the space partition wall part 240*a*, and may be formed into a plurality of spaces corresponding to the plurality of side through holes 200*a*.

The internal space of the wire end insertion part 240 is divided, by the space partition wall part 240*a*, into the plurality of spaces corresponding to the plurality of side through holes 200*a* positioned on both side parts 201 of the lower casing member 200. Accordingly, the wire end insertion part 240 may protect an end of a second wire 20 by inserting the end into an insertable space regardless of an insertion direction or a selected side through hole 200*a* of the second electric wire 20 inserted into any selected one of the plurality of side through holes 200*a* on both side parts 201 of the lower casing member 200.

In addition, the exemplary embodiment of the detonator connector having the wire protection structure according to the present disclosure further includes a wire protection lubrication member 250 positioned inside the wire end insertion parts 240 to form an oil film by surrounding the ends of the wire 10 and 20, i.e., as an example, the second wire 20.

The wire protection lubrication member 250 forms the oil film by surrounding the end of each wire inserted into the wire end insertion parts 240, thereby protecting the end of the second wire 20 from liquid such as water and preventing electrical accidents such as short circuits that may be caused by water penetrating into the lower casing member 200.

In addition, the exemplary embodiment of the detonator connector having the wire protection structure according to the present disclosure further includes a terminal protection lubrication member 260 for forming an oil film by surrounding an outer surface of the wiring bracket member 100.

The terminal protection lubrication member 260 is applied or coated so as to wrap the wiring bracket member 100 and a connection portion of a wire connected to the wiring bracket member 100, thereby protecting the wiring bracket member 100 and the connection portion of the wire connected to the wiring bracket member 100 from liquid such as water and preventing electrical accidents such as short circuits that may be caused by water penetrating into the lower casing member 200.

The wire protection lubrication member 250 forms an oil film by surrounding each of the end of the first wire 10 and end of the second wire 20, which are positioned inside the lower casing member 200, so that both the end of the first wire and the end of the second wire 20 may be protected from foreign substances such as water, and also a short circuit accident between the (+) wire and the (−) wire of the first wire or a short circuit accident between the (+) wire and the (−) wire of the second wire may be prevented.

As an example, the wire protection lubrication member 250 and the terminal protection lubrication member 260 are grease. In addition to this, it should be noted that various modifications may be implemented with known lubricants, and thus further detailed descriptions are omitted.

Meanwhile, on the front side of the lower casing member 200, a wire entrance allowing the first wire 10 to be wired therein is positioned, and between the wire entrance and the wiring bracket member 100, the wire position locking part 500 for fixing a position of the first wire 10 by elastically catching and pressurizing the first wire 10 is positioned.

The wire position locking part 500 is positioned between the wire entrance and the second wire connection bracket part 120, so as to fix the position of the first wire 10 wired to the wire passage part.

Figure 6:
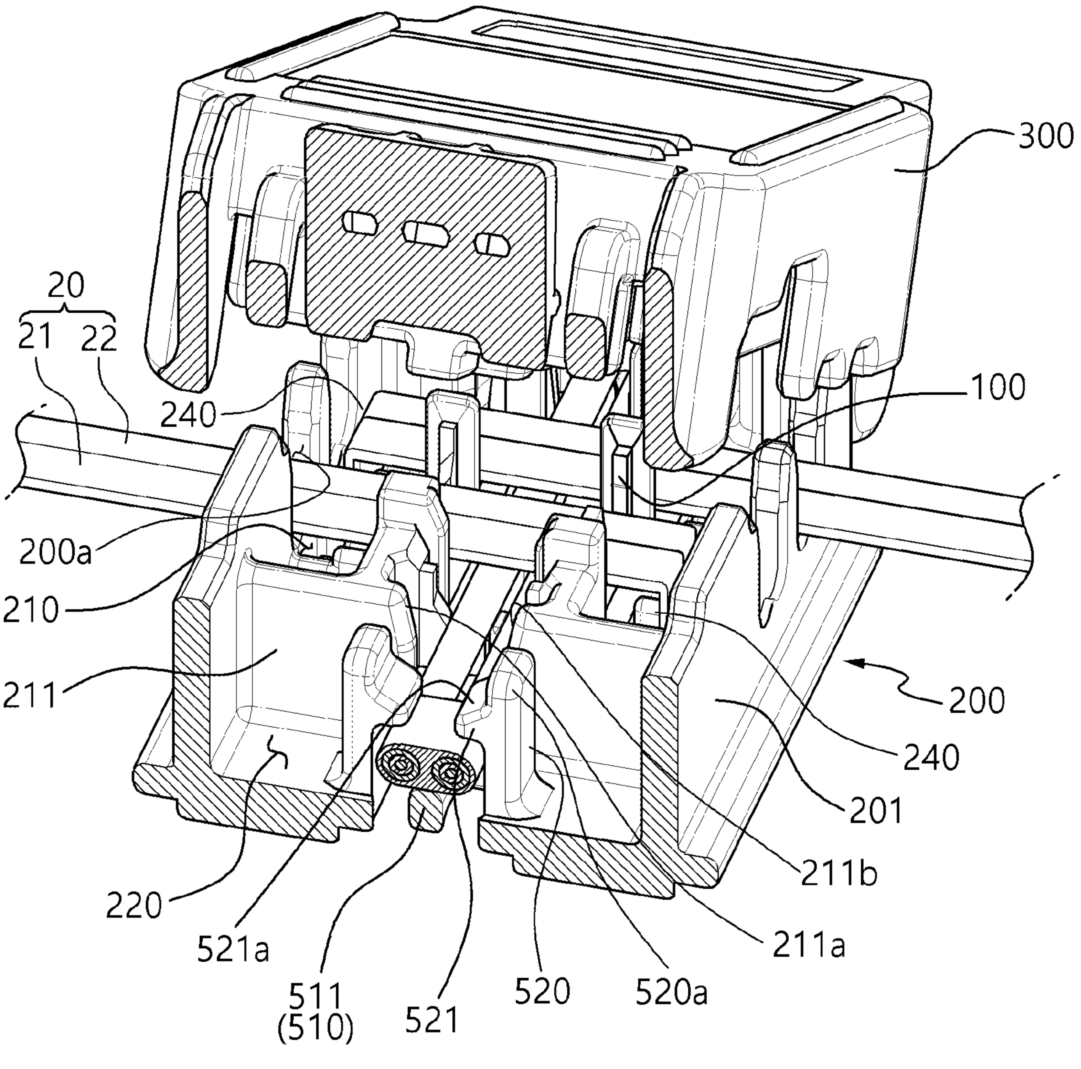
FIG. 6 is a cross-sectional perspective view illustrating a wire position locking part in the detonator connector having the wire protection structure according to the present disclosure.
Figure 7:
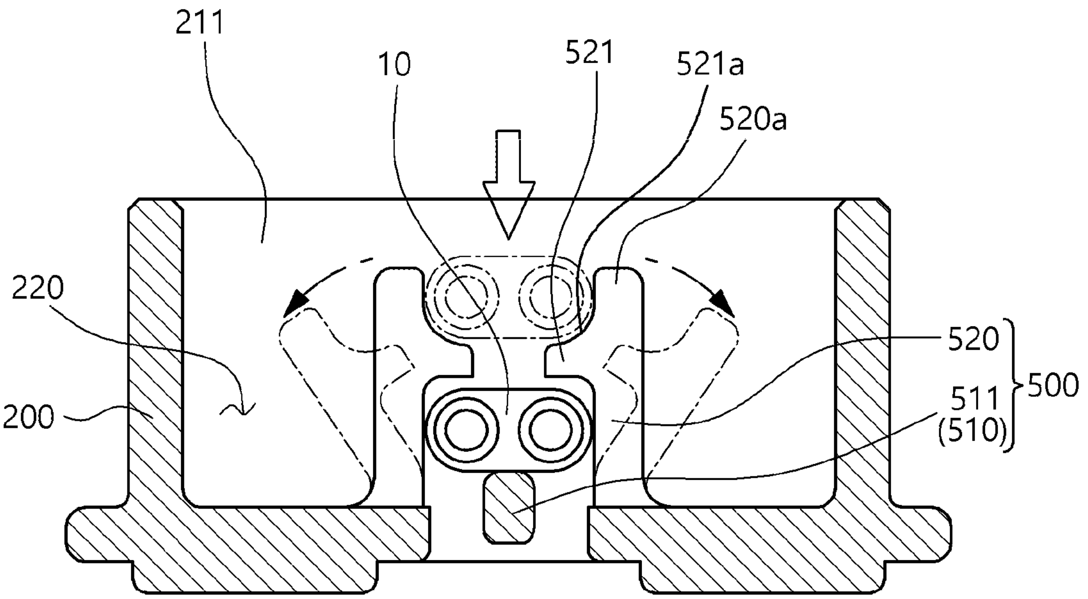
FIG. 7 is a cross-sectional view illustrating the wire position locking part in the detonator connector having the wire protection structure according to the present disclosure.

FIG. 6 is a cross-sectional perspective view illustrating the wire position locking part in the detonator connector having the wire protection structure according to the present disclosure, and FIG. 7 is a cross-sectional view illustrating the wire position locking part in the detonator connector having the wire protection structure according to the present disclosure.

Referring to FIGS. 1, 6, and 7, an exemplary embodiment of the wire position locking part 500 will be described in detail below.

The wire position locking part 500 includes: a wire support part 510 having an upper part thereof on which a first wire 10 is placed; and a pair of wire support members 520 positioned standing upright on both sides of the first wire 10 passing through the wire entrance and wired inside the lower casing member 200, configured to support both sides of the first wire 10, and having upper end sides thereof from which wire catch jaw parts 521 protrude to catch an upper part of the first wire 10.

Having a rod shape, each of the pair of wire support members 520 is positioned standing upright, may allow the first wire 10 to be inserted into a gap in between, which is created by widening by elasticity, when the first wire 10 is pressurized from an upper side toward both sides, and may return to an original position thereof by the elasticity when the leg wire 10 passes between the wire catch jaw parts 521 facing each other and is inserted into the gap, thereby fixing a position of the first wire 10 by catching the upper part of the first wire 10 with the wire catch jaw parts 521.

On an upper surface of the wire support part 510 on which the first wire 10 is seated, each wire catch jaw part 521 has a height of 95% or more and less than 100% compared to a thickness of the first wire 10, so that the pair of wire support members 520 elastically may pressurize the first wire 10 seated on the wire support part 510 with each of the wire catch jaw parts 521 protruding inward, thereby fixing the position of the first wire 10.

The pair of wire support members 520 is provided with respective leg wire support rib parts 520*a* extending and protruding from respective upper parts of the wire catch jaw parts 521 to support both sides of the first wire 10 placed therebetween.

When the first wire 10 is placed and pressurized on upper surfaces of the wire catch jaw parts 521, the leg wire support rib parts 520*a* support both side ends of the first wire 10 and guide vertical movement of the first wire 10, so as to allow the first wire 10 to easily pass between the wire catch jaw parts 521 and reduce a force by which an operator causes the first wire 10 to pass between the leg wire catch jaw parts 521, whereby convenience of work may be secured.

In addition, each of the upper surfaces of the wire catch jaw parts 521 has an inclined surface or is formed in a circular arc shape having a curvature, so that when the first wire 10 is placed and pressurized thereon, the pair of wire support members 520 may be bent elastically and smoothly.

More specifically, each of the upper surfaces of the wire catch jaw parts 521 is formed of a circular arc surface 521*a* having a curvature equal to or greater than a curvature of the first wire 10, i.e., a curvature including the coating of the first wire 10, so that when the first wire 10 is placed and pressurized from an upper side, the pair of wire support members 520 may be elastically and smoothly bent and opened.

On a lower surface of the upper casing member 300, there is provided a leg wire support protrusion part 320 for supporting an upper surface of the first wire 10 passed between the pair of wire catch jaw parts 521 and caught by and positioned on the wire catch jaw parts 521 between the pair of wire support members 520.

In a state where the upper casing member 300 closes the upper side of the lower casing member 200, the leg wire support protrusion part 320 supports the upper surface of the first wire 10 locked with the pair of wire catch jaw parts 521 between the pair of wire support members 520, thereby limiting the movement of the first wire 10 so as not to lift to an upward side.

In a state where the upper casing member 300 is closed, the leg wire support protrusion part 320 presses and supports the upper surface of first wire 10 locked between the pair of wire support members 520, so that the movement of the first wire 10 to the upper side may be completely limited.

In addition, as an example, the wire support part 510 is a support rod member 511 having elasticity and disposed in a straight line in a wiring direction of the first wire 10.

The support rod member 511 is positioned in the center of the first wire 10 at the bottom of the first wire 10 to elastically support the first wire 10, and is elastically bent when the pair of wire catch jaw parts 521 catches and supports the upper surface of the first wire 10, thereby enabling a position of the first wire 10 to be firmly fixed.

The support rod member 511 is positioned to be spaced apart from the lower surface of the lower casing member 200, and is positioned to support the central part of first wire 10, i.e., a lower part of a boundary part where the coatings of the first leg wire 11 and the second leg wire 12 adhere each other.

The lower casing member 200 includes therein: a wiring space part 210 in which a wiring bracket member 100 is positioned and both the first wire 10 and second wire 20 are wired and connected to each other by the wiring bracket member 100; and a leg wire locking space part 220 divided by a first partition wall 211 at a front side of the wiring space part 210 and in which a wire position locking part 500 is positioned.

In addition, the lower casing member 200 further includes therein: a casing locking space part 230 divided by a second partition wall 221 at a front side of the leg wire locking space part 220 and in which a casing locking part 600 is provided.

In the lower casing member 200, the wiring space part 210 is positioned at an inner side of the first partition wall 211, the leg wire locking space part 220 is positioned between the first partition wall 211 and the second partition wall 221, and the casing locking space part 230 is positioned between the second partition wall 221 and the front surface of the lower casing member 200.

A first wire entrance 200*b* is positioned in the front side of the lower casing member 200, and a second wire entrance 200*c* and a third wire entrance 200*d*, which are positioned in a straight line with the first wire entrance 200*b*, are respectively provided in the second partition wall 221 and the first partition wall 211.

On both respective sides of the third wire entrance 200*d* positioned on the first partition wall 211, a first guide inclined surface 211*a* and a second guide inclined surface 211*b* are positioned to guide a leg wire 10 to be inserted between the wire support members 520 by moving the first wire 10 inward when the first wire 10 is inserted into the respective upper sides thereof.

The first guide inclined surface 211*a* and the second guide inclined surface 211*b* are formed as respective inclined surfaces forming a V shape and facing each other to guide the first wire 10 toward both side surfaces of the third wire entrance 200*d* positioned in an inner middle position.

The first guide inclined surface 211*a* and the second guide inclined surface 211*b* are configured to guide the first wire 10 to be smoothly inserted into a position between the wire support members 520.

In addition, the first wire 10 may be fitted and coupled between both side surfaces of the third wire entrance 200*d*. The first guide inclined surface 211*a* and the second guide inclined surface 211*b* not only guide the first wire 10 to be smoothly inserted between the wire support members 520, but also allow the first wire 10 to be fitted and coupled to the third wire entrance 200*d*, thereby causing the position of the first wire 10 to be more firmly fixed.

The first wire 10 is wired in a straight line within the wiring space part 210 through the first wire entrance 200*b*, the second wire entrance 200*c*, and the third wire entrance 200*d*, so that the first leg wire 11 is fitted and connected to the third wire fitting groove 105 of the second wire connection bracket part 120 and the second leg wire 12 is fitted and connected to the fourth wire fitting groove 106 of the fourth wire connection bracket part 140.

In the lower casing member 200, the wiring space part 210 for wiring a second wire 20 and a first wire 10 to each other, the leg wire locking space part 220 for locking a position of the first wire 10, and the casing locking space part 230 for locking the closed upper casing member 300 are divided independently of each other, so that a connection between the second wire 20 and the first wire 10 is made stable, the position of the first wire 10 wired in the wiring space part 210 is stably fixed in the leg wire locking space part 220 and is locked in the casing locking space by the closed upper casing member 300, whereby the locked state may be stably maintained.

In addition, both end sides of the support rod member 511 may be fixed to the respective first partition wall 211 and second partition wall 221, so as to be spaced apart from the lower surface of the lower casing member 200 and to be stably positioned thereover, thereby elastically supporting a lower part of the first wire 10.

The first wire 10 is placed on the support rod member 511 having elasticity, and an upper side of the first wire 10 is caught by the wire catch jaw parts 521 of the wire support members 520 positioned standing upright on both sides and elastically pressurized by the wire catch jaw parts 521, so that while the first wire 10 is elastically pressurized between the wire catch jaw parts 521 and the support rod member 511, the position of the first wire 10 may be stably and firmly fixed.

Figure 8:
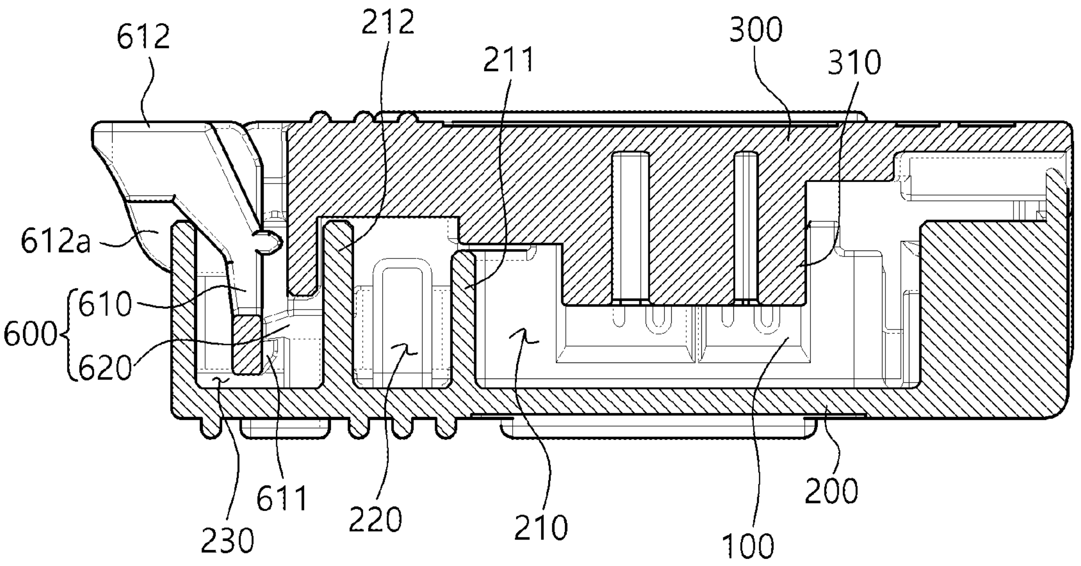
FIG. 8 is a cross-sectional view taken along line A-A' of FIG. 3.
Figure 9:
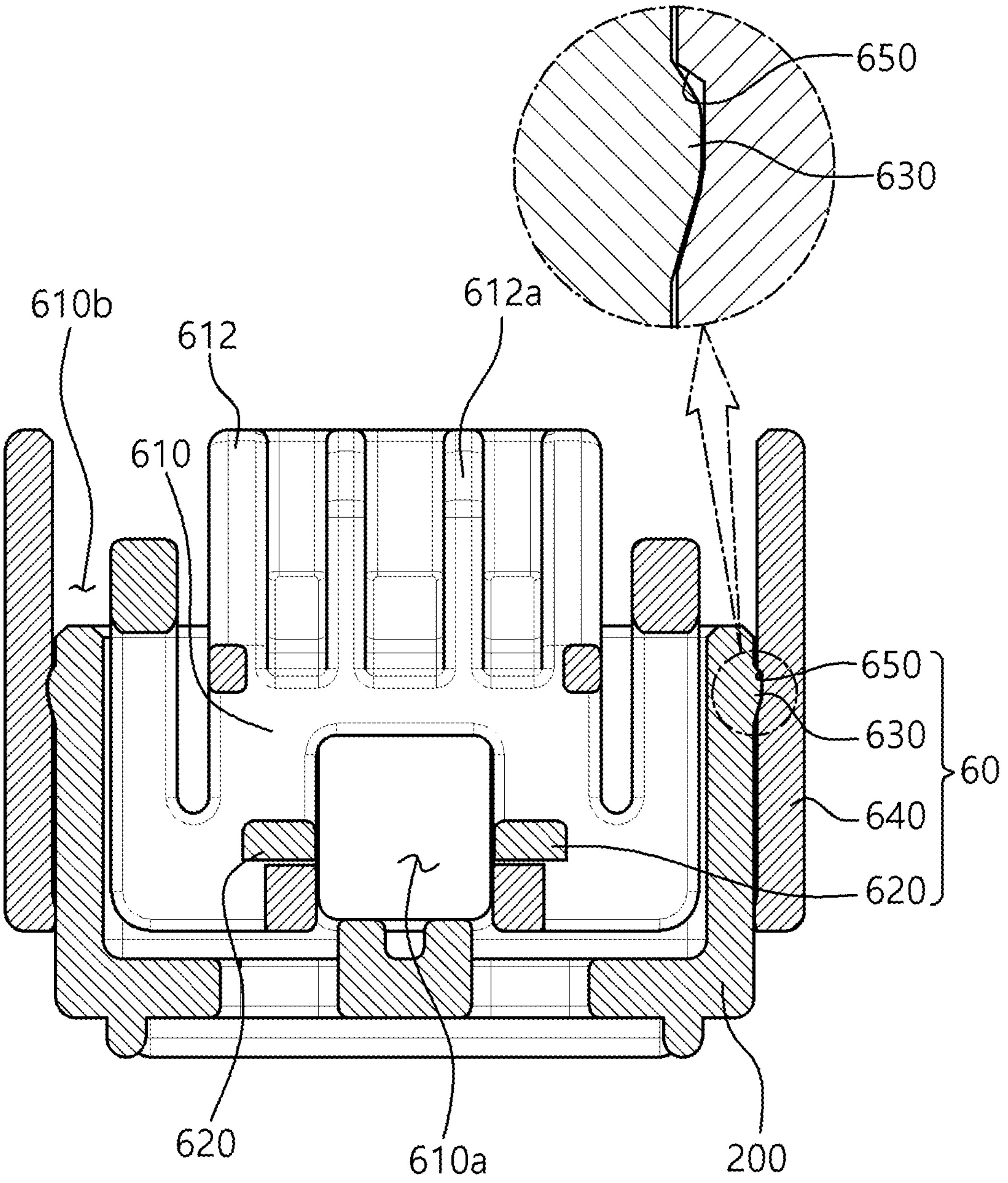
FIG. 9 is a cross-sectional view taken along line B-B' of FIG. 4.

FIG. 8 is a cross-sectional view taken along line A-A' of FIG. 3, and FIG. 9 is a cross-sectional view taken along line B-B' of FIG. 4. Referring to FIGS. 1, 2, 8, and 9, an exemplary embodiment of the casing locking part 600 in the exemplary embodiment of the detonator connector having the wire protection structure according to the present disclosure will be described in detail below.

The casing locking part 600 includes: an elastic locking panel part 610 elastically bent in front and rear directions, provided with first locking catch jaws 611 protruding from lower end sides thereof, and positioned on a front side of the upper casing member 300 so as to be inserted into the casing locking space part 230; and first locking catch parts 620 in which the first locking catch jaws 611 are caught and positioned in the casing locking space part 230.

A wire passage part 610*a* through which a first wire 10 may pass is positioned in the elastic locking panel part 610. The wire passage part 610*a* is positioned on a straight line with the first wire entrance 200*b*, so as to allow the first wire 10 passed through the first wire entrance 200*b* to pass through the second wire entrance 200*c* and the third wire entrance 200*d*.

The elastic locking panel part 610 includes an unlocking handle part 612 protruding to a front thereof and enabling an operator to pull or push the elastic locking panel part 610 by the operator's hand manipulation.

In addition, the first wire entrance 200*b* positioned on the front surface of the lower casing member 200 is formed in a shape open to an upper side thereof. The unlocking handle part 612 includes lock stopper protrusion parts 612*a* protruding to be inserted into the first wire entrance 200*b* in the front, and allowing both side surfaces thereof to be supported by inner surfaces of the first wire entrance 200*b*, so as to guide forward and backward movement of the elastic locking panel part 610.

By pulling or pushing the unlocking handle part 612, the operator may release a locked state of the first locking catch parts 620 caught and positioned by the first locking catch jaws 611. In this case, since the unlocking handle part 612 is inserted into the first wire entrance 200*b* and moves while being supported on the inner surfaces of the first wire entrance 200*b*, the locked state may be released stably with little force.

In addition, even when the upper casing member 300 is closed and the first locking catch jaws 611 are caught and locked by the first locking catch parts 620, the first locking catch jaws 611 may be caught and locked by the first locking catch parts 620 in a regular position because the unlocking handle part 612 is inserted into the first wire entrance 200*b* and moves while being supported on the inner surfaces of the first wire entrance 200*b*.

In addition, in a state where the first locking catch jaws 611 are caught by the first locking catch parts 620, since an unlocking catch part is inserted into the first wire entrance 200*b* and is limited in movement in both directions, the first locking catch jaws 611 are caught by the first locking catch parts 620 in the regular position and stably maintained in the locked state, whereby the locked state of the closed upper casing member 300 may be firmly maintained.

Since the elastic locking panel part 610 is designed to use a seesaw principle for the lower case member 200, the resisting force of the unlocking handle part 612 against external interference may be increased by adjusting a position of a support point (i.e., a fulcrum).

In addition, the elastic locking panel part 610 increases the amount of flexibility of the unlocking handle part 612 against the external interference, so that even when the unlocking handle part 612 moves a lot, the fastening force of the first locking catch parts 620 may be maintained.

Accordingly, the casing locking part 600 enables the detonator connector to be easily redesigned and used according to a working environment.

In addition, the casing locking part 600 may further include: second locking catch jaw parts 630 positioned on both sides of the lower casing member 200; locking side parts 640 positioned to cover the second locking catch jaw parts 630 at respective front part sides of the upper casing member 300; and second locking catch parts 650 positioned on inner surfaces of the locking side parts 640 and into which the second locking catch jaw parts 630 are inserted and caught thereby.

The casing locking part 600 may lock the closed state of the upper casing member 300 more firmly and stably with a double catch structure of the first locking catch jaws 611 and the second locking catch jaw parts 630.

In addition, between the locking elastic panel part 610 and the locking side parts 640, there is provided lower side fitting parts 610*b* into which both side parts of the lower casing member 200, i.e., both side parts of the casing locking space part 230 are inserted.

While both side parts of the lower casing member 200, i.e., both side parts of the casing locking space part 230 are fitted and inserted into the lower side fitting parts 610*b*, the elastic locking panel part 610 is limited in movement in both directions, whereby the first locking catch jaws 611 may be more stably maintained in a locked state by being caught by the first locking catch parts 620 in the regular position, and the locked state of the closed upper casing member 300 may be maintained more firmly.

The present disclosure is provided with a space into which an end of each wire is inserted so as to facilitate protection of an end side of each wire, thereby enabling to greatly improve convenience in the work of connecting a blasting machine and a detonator to each other with the wires and reduce working time.

In addition, the present disclosure may ensure that the position of the double-coated wire or single-coated wire used as the first wire 10 may be elastically locked and fixed at the entrance side, so as to stably maintain the internal connection state, thereby securing connection stability and connection reliability between the first wire 10 and the second wire 20.

It should be noted that the present disclosure is not limited to the above-described exemplary embodiments, but can be implemented with various changes without departing from the gist of the present disclosure, and the changes are included in the configuration of the present disclosure.

The invention claimed is:

1. A detonator connector having a wire protection structure, the detonator connector comprising:

a wiring bracket member made of a conductive material and provided with a plurality of wire fitting grooves into which a plurality of wires are inserted;

a lower casing member on which the wiring bracket member is positioned; and an upper casing member configured to cover an upper part of the lower casing member, wherein wire end insertion parts into which end sides of the wires are inserted are provided in an inside of the lower casing member, wherein the wire end insertion parts are positioned to enable vertically folded or vertically bent ends of the wires fitted to the wire fitting grooves of the wiring bracket member to be inserted, and the vertically folded or vertically bent ends side of the wire positioned inside of the lower casing member, wherein each wire end insertion part comprises:

a wire protection partition wall part for surrounding a space in which the ends of the wires are inserted, wherein a first wire is fitted to any one side of the plurality of wire fitting grooves, and a second wire is fitted to another side of the plurality of wire fitting grooves, thereby wiring the first wire and the second wire to each other, and at least any one end of the first wire and the second wire is inserted into the wire end insertion parts.

2. The detonator connector of claim 1, wherein a plurality of side through holes through which the respective wires pass is positioned in both side parts of the lower casing member, and an inner space of each wire end insertion part is divided by a space partition wall part, so as to be formed into a plurality of spaces corresponding to the plurality of side through holes.

3. The detonator connector of claim 1, wherein the wire protection partition wall part is formed with the insertion space having a size allowing a clearance space to be formed around an outer circumference of the end of each wire.

4. The detonator connector of claim 1, wherein the wire end insertion parts are positioned between respective side parts of the lower casing member and the wiring bracket member, and the wire protection partition wall part comprises:

a first wire protection partition wall positioned between a side part of the lower casing member and the wiring bracket member; and a pair of second wire protection partition walls having both ends thereof fixed to the side part and the first wire protection partition wall and spaced apart from each other, so as to form the space enabling the end of each wire to be inserted therein.

5. The detonator connector of claim 4, wherein the first wire protection partition wall is provided with a wire seating groove part on which each wire is seated.

6. The detonator connector of claim 1, further comprising:

a wire protection lubrication member positioned inside the wire end insertion parts to form an oil film by surrounding the end of each wire.

7. The detonator connector of claim 6, further comprising:

a terminal protection lubrication member for forming an oil film by surrounding an outer surface of the wiring bracket member.

8. The detonator connector of claim 7, wherein the wire protection lubrication member and the terminal protection lubrication member are grease.

9. The detonator connector of claim 1, wherein each wire comprises:

the first wire inserted into the inside of the lower casing member through a front wire entrance of the lower casing member; and the second wire inserted into the inside of the lower casing member by passing through a side part of the lower casing member, the wiring bracket member comprises:

a first wire connection bracket part positioned to be spaced apart from any one side part of the lower casing member and to which any one of a positive pole (+) wire and a negative pole (−) wire of the second wire is fitted and connected;

a second wire connection bracket part formed by being folded at a first end side of the first wire connection bracket part and to which any one of a positive pole (+) wire and a negative pole (−) wire of the first wire is fitted and connected;

a third wire connection bracket part positioned to be spaced apart from the other side part of the lower casing member and to which the other of the positive pole (+) wire and the negative pole (−) wire of the second wire is fitted and connected; and a fourth wire connection bracket part formed by being bent at a second end side of the third bracket part and to which the other of the positive pole (+) wire and the negative pole (−) wire of the first wire is fitted and connected, and the respective wire end insertion parts are positioned between any one side part of both side parts of the lower casing member and the first wire connection bracket part, and between the other side part of the lower casing member and the third wire connection bracket part.

* * * * *